United States Patent [19]

Huang et al.

[11] Patent Number: 5,008,885
[45] Date of Patent: Apr. 16, 1991

[54] EVENT-CONTROLLED ERROR INJECTION SYSTEM

[75] Inventors: Kevin C. Huang, Endicott, N.Y.; Karl H. Kutz, Berlin; Timothy J. McNamara, Endicott, N.Y.; Victoria E. Seals, Alpharetta, Ga.; Gregory S. Still, Endwell, N.Y.

[73] Assignee: International Business Machines Corporation, Armonk, N.Y.

[21] Appl. No.: 291,544

[22] Filed: Dec. 29, 1988

[51] Int. Cl.$^5$ .............................................. G06F 11/00
[52] U.S. Cl. ......................................... 371/3; 371/5.1; 371/12; 371/16.5
[58] Field of Search ................ 371/5.1, 5.3, 12, 3, 371/13.1, 16.1, 16.5

[56] References Cited

U.S. PATENT DOCUMENTS

| | | | |
|---|---|---|---|
| 4,228,537 | 10/1980 | Henckels et al. | 371/23 |
| 4,308,616 | 12/1981 | Timoc | 371/23 |
| 4,439,858 | 3/1984 | Peterson | 371/20 |
| 4,554,636 | 11/1985 | Naggi et al. | 364/431 |
| 4,669,081 | 5/1987 | Matthewes | 371/3 |
| 4,743,840 | 5/1988 | Sato | 371/3 |
| 4,759,019 | 7/1988 | Bentley et al. | 371/3 |
| 4,779,271 | 10/1982 | Suzuki | 371/3 |
| 4,835,459 | 5/1989 | Hamlin | 371/3 |

OTHER PUBLICATIONS

IBM Technical Disclosure Bulletin, vol. 11, No. 8, Jan. 1969, Computer Fault Generator, by R. L. Cormier, J. K. Gerken, Jr., and J. A. Laird.
IBM Technical Disclosure Bulletin, Oct. 1973, Error Injection Simulator in Lugout Analysis of Central Processor Hardware Failures, V. Berzins and V. A. Fischer.
IBM Technical Dislcosure Bulletin, vol. 17, No. 6, Nov. 1974, Error Injector for Testing a Data Processing Unit, by D. G. East and A. M. Kazi.
IBM Technical Disclosure Bulletin, vol. 18, No. 1, Jun. 1975, Error Injector Probe, by D. W. Maiden and J. J. Shakib.
IBM Technical Disclosure Bulletin, Jan. 1978, Error Injector Tool, by J. N. Gaulrapp, W. A. Wiktor, Jr., and D. J. Willson.
IBM Technical Disclosure Bulletin, Mar. 1988, Main Store Data ECC Error Injection.
IBM Technical Disclosure Bulletin, vol. 30, No. 11, Apr. 1988, SPD I/O Bus Error Injector and Detector.

Primary Examiner—Michael R. Fleming
Attorney, Agent, or Firm—Baker, Maxham, Jester & Meador

[57] ABSTRACT

Programmable masks at ascending levels of processing machine functionality support the programmed injection of errors in response to machine events and machine states and in synchronism with machine operation. Provision is made for varying characteristics of injected errors through a programmable error mask and through generation of an injected error wave form having variable temporal and duration characteristics.

10 Claims, 3 Drawing Sheets

EVENT-CONTROLLED ERROR INJECTION SYSTEM

BACKGROUND OF THE INVENTION

This invention is in the field of computer systems, and particularly pertains to the testing of computer restart, retry and recovery mechanisms by the purposeful injection of errors into a computer system in order to provoke and evaluate a restart, retry or recovery mechanism.

In the past art of error injection, errors were injected by probing pins or circuit paths in order to force connected circuitry to certain states indicating the occurrence of errors. With miniaturization and integration of circuit functions resulting in a manifold increase of functionality on a decreasing physical base, specific circuit points of interest are usually not available at accessible locations. Packaging and miniaturization make the probing of specific points internal to circuitry impractical. Further, the nature of circuit technology currently in vogue is not compatible with "OR dotting" of an error signal into a circuit.

Further, the known modes of error injection are unsuitable for realistically evaluating computer error response. The prior art of error injection is based primarily upon error initiation which occurs without regard to, or as the result of, circuit operation. In this regard, error injection may be synchronized with circuit operations in the sense that the error injection mechanism responds to a clock which also drives the circuit that will receive the error. However, the mechanism initiates the error with total disregard for circuit events Therefore, the error is triggered in an arbitrary manner, without considering the state of the circuit.

Therefore, there is a manifest need for an error injection mechanism in a computer system which can simulate computer malfunction by injecting errors by a means which is compatible with circuit fabrication technology, and in a mode which is influenced by machine operation.

SUMMARY OF THE INVENTION

The inventors have realized that the usefulness of error injection is enhanced by operating the injection mechanism in response to the processes which are innate to the machine being tested. Further, the inventors have observed that the incorporation of error injection into machine functionality is achieved by provision of an error injection mechanism which can be physically integrated with the machine being tested. Also important is the inventors' realization that a close approximation of the randomness with which true errors occur and manifest themselves necessitates the provision of a variety of modes of error injection.

In giving form and function to their invention, the inventors provide a mechanism for injecting errors for test and evaluation of a processing machine in which a plurality of machine events occur over time. The injection mechanism includes a machine event collector distributed within the machine and a programmable event mask circuit distributed within the machine and connected to the machine event collector for masking events collected by the event collector to detect a mask-defined machine state. A counter is provided which is connected to the mask circuit for counting the occurrences of the mask-defined machine state, and a programmable mode error injector is connected to the counter for injecting an error into the machine upon the counter reaching a certain count. The error is injected according to an intermittent mode, or according to a continuous mode. Provision is made in the programmable mode error injector for selectively delaying the injection of the error from the occurrence of the state count which stimulates the error.

A primary objective of this invention, therefore, is to provide the error injection mechanism which is merged logically, functionally, and physically with the processing machine that it serves.

Specifically, this objective is achieved by the error injection system of the invention, which injects errors into the processing machine for testing and evaluating the machine, the injection responding to preselected states of the machine.

Achievement of this objective and other attendant advantages and benefits by the practice of this invention will be appreciated when the following detailed description is read with reference to the below-described drawings.

DETAILED DESCRIPTION OF THE PREFERRED EMBODIMENT

In this application, the term "processing machine" is synonymous with the term "computer", "processor", and "computer facility", or any other equivalent term. The term "event" signifies the occurrence or existence of a condition affecting data in a processing machine, or affecting processes executing in the machine. An event is represented by the state of a signal generated by hardware, software, or firmware of the processing machine upon the happening of the condition. Last, the term "machine state" refers to the concurrent existance of sets of particular conditions within a processing machine. "Retry", "restart" and "retrieval" mechanisms and processes are given the usual meanings; see for example the meanings given in Sippl's Computer Dictionary, Fourth Edition, 1986.

As is known, retry and recovery mechanisms are provided in processing machines for the purpose of reacting to a machine error (or "machine check") by stopping some, or all, of the processing activity of the machine, placing it into a "retry" state, and starting machine operation from this state. The testing of such mechanisms is problematical. By their very nature they operate in response to events which are pathological, sporadic and unpredictable. The invention provides a means for injecting errors which appear to be "real" errors by operating in response to alterable patterns of machine events. The alterable patterns are in the form of masks that are distributed within the processing machine and located at the sites which the events they are masking are generated. The overall form of the error injection system is illustrated in FIG. 1.

Figure 1:
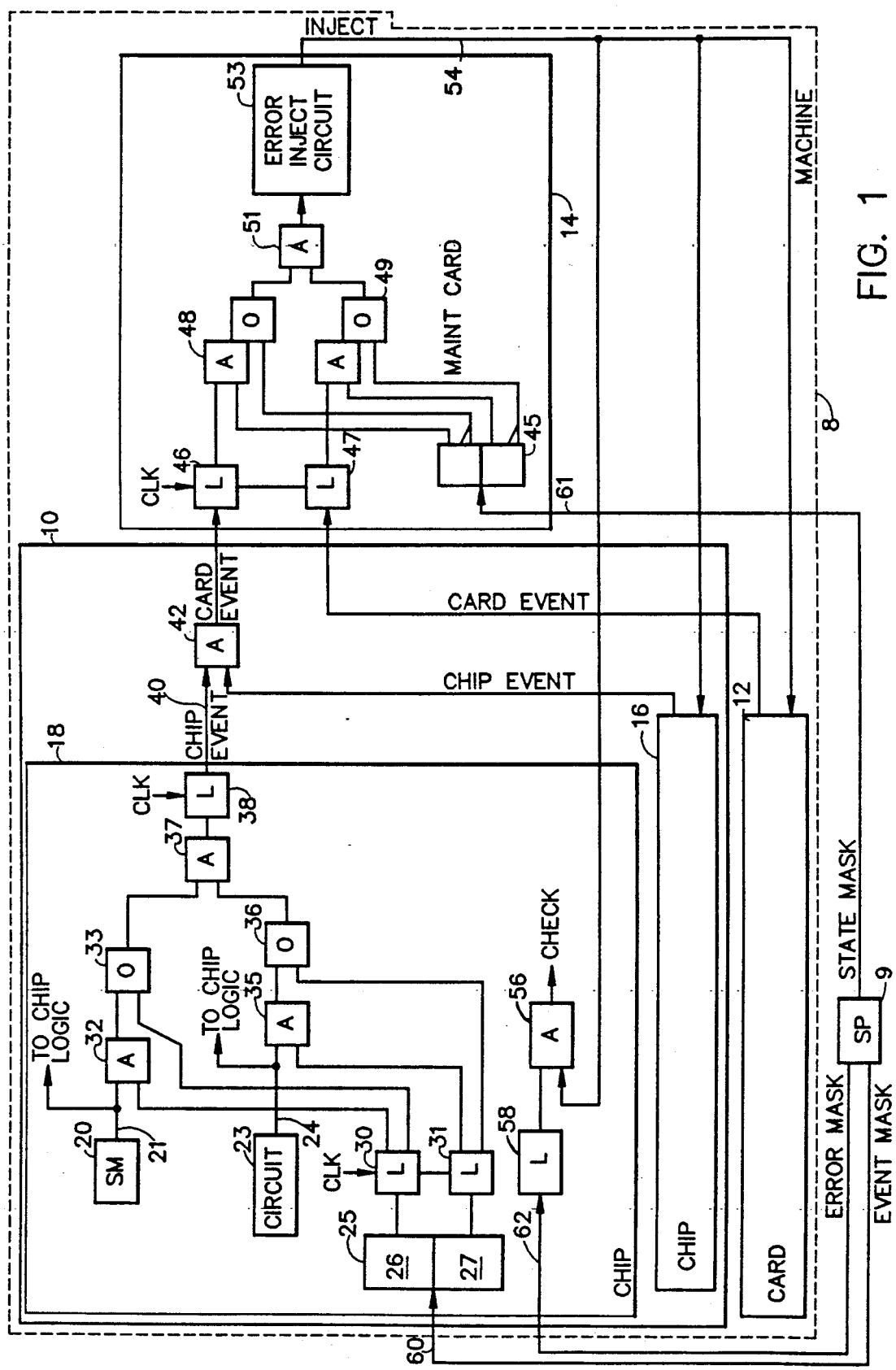
FIG. 1 is a detailed block diagram illustrating the error injection mechanism of the invention in a form which is integrated within the processing machine which it serves.

In FIG. 1, a processing machine 8 is illustrated. The processing machine can comprise, for example, a I/0 processor attached to a mainframe computer for the exchange of data between the main storage of the computer and peripheral devices. The processing machine 8 exhibits a modular design having several levels of definition. The highest level of structural definition includes cards 10 and 12. It is asserted that a card is a modularized, replaceable unit and carries logic in the form of any combination of hardware, software or firmware assembled to perform some defined high-level function or functions of the processing machine. Characteristically, the processing machine is formed by the integration of a plurality of cards by means of a physical backplane structure into which the cards can be plugged, and from which the cards can be removed for replacement.

Typically, a card, such as the card 10, derives its functionality from a plurality of monolithic integrated devices, such as chips 16 and 18, mounted on the card. The chip 18 is an integrated semiconductor device that includes a plurality of logic units in the form of hardwired, programmed, or programmable circuitry. For example, the chip 18 may include programmed circuitry forming a state machine (SM) 20, and a logic circuit 33 which can comprise a collection of gates or other elementary devices interconnected to perform a specific function. Although it is not shown, the chip 18 also includes other logic "chip logic" to which the state machine 20 and circuit 23 are connected.

During operation, assume that the state machine exhibits a condition signified by a signal on the line 21, which is termed an event. Likewise, the signal line 24 conducts a signal generated by the circuit 23 that is representative of another event.

Machine processes and functions are synchronized by a common clock signal CLK. This signal is generated conventionally and distributed throughout the machine down to the chip level. It has a conventional wave shape consisting of a succession of pulses at equal intervals.

THE INVENTION

The invention includes a structure that is distributed within the processing machine 8 and which includes portions integrated onto chips carried on the cards forming the processing machine. In this regard, the elements of the invention which are provided at the chip logic level are represented by a programmable mask register 25, gates 32, 33, 35, 36, 37 and a latch 38. For illustration of the invention, error generation is provided at the chip level by, for example, a programmable error mask latch 58 and a gate 56. Although not illustrated, it is asserted that the chip 16 also includes elements of the invention which correspond to those listed above for the chip 18 as do other chips on the card 10 which are not illustrated. Further, it is asserted that structural elements of the invention are present also in chips on the card 12.

The invention includes a set of card-level elements that embraces card gates corresponding to the gate 42 of card 10. In addition, card level elements are placed on a card 14 which is termed a "maintenance" card. The card level elements on the maintenance card 14 include a programmable state mask register 45, clock latches 46 and 47, gates 48, 49, and 51, and a multimode error injection circuit 53.

The error injection circuit 53 provides a signal which is sent back to chip level circuitry of the processing machine. One set of such chip level circuitry includes the gate 56 and the error mask latch 58.

In the invention, the circuit-level circuitry connected to the mask register 25, for example, continuously monitors the signal lines 21 and 24 to detect the occurrence of a pattern of events corresponding to a mask in the register 25. When such a pattern occurs, a CHIP EVENT signal is provided on signal line 40 to a card-level collection gate 42, where it is combined using the well-known AND function with other chip events on the card 10. Concurrency of all chip events collected by the gate 42 will raise a CARD EVENT signal on the signal line 44 that is provided to the card-level circuitry on the maintenance card 14. The card-level circuitry on the maintenance card 14 collects all of the card events and compares them against a condition mask in the register 45, which corresponds to a state of the process machine 8 that is of interest. The machine state is indicated by a positive output from AND 51. The multimode select error injection logic 53 responds to occurrences of the masked machine state by providing an INJECT signal on signal line 54 that is fed back to the chip-level error generation circuitry illustrated by gate 56 and latch 58. The invention also provides for masking of error generation in response to an INJECT signal so that a selectable pattern of errors can be generated in response to the INJECT signal.

It will be evident to those skilled in the art that the pattern programmability provided by the masking of events, conditions, and error patterns provides a wide-ranging, yet subtle, capacity to simulate error conditions. These error conditions can be fine-tuned to fully test the intricate retry and restart mechanisms characteristic of modern processing machines. Programmability of the event, machine state, and error pattern masks is provided by software-level programming access to the mask registers. These connections are represented by event mask, state condition mask, and error mask signal lines 60, 61, and 62, respectively. For the sake of illustration, these lines originate at a processing entity 9 which is called a support processor (SP). The support processor may be an entity which is external to the processing machine 8, yet which has access to the machine through the software which controls it. Software access can be provided, for example, by a generic LOAD IMMEDIATE REGISTER command which manipulates the mask registers.

In detail, the chip-level, event masking portion of the invention includes the event mask register 25, comprised of latches 26 and 27. The positive outputs of the latches 26 and 27 are fed, respectively, to AND gates 32 and 35, while the complementary latch outputs are fed to OR gates 33 and 36. The AND gates 32 and 35 are connected to the event signal lines 21 and 24, which are driven, respectively, by the state machine 20 and the circuit 23. When an event occurs, indicated by the conditioning of a signal to its positive digital state, the AND gate receiving the event signal will provide a positive output only if the corresponding mask latch has been set. The positive outputs of the AND gates 32 and 35 are fed forward, respectively, by the OR gates 33 and 36. If the corresponding mask latch is not set, the latch's complementary output will be fed forward by its respective OR gate to the AND gate 37. Thus, the AND gate collects and senses conditions of all mask events.

Positive output of the AND 37 gate signifies the simultaneous occurrence of all masked events on the chip 18. The positive output is captured by the latch 38 at the transition of the CLK signal and forwarded thereby to the card-level AND gate 42.

The card-level AND gate 42 collects all of the chip event signals produced on the card 10. When those signals are logically positive in the same clock period, the output of the AND gate 42 transitions positively to produce the CARD EVENT signal on signal line 44. CARD EVENT signals are collected in latches 46 and 47 of maintenance card 14 where they are masked in the manner heretofore described for the chip level circuitry by the combination of the state mask register 45, and AND/OR gate combinations 48 and 49. It will be evident that the mask in the register 45 represents a state of the machine 8. When the machine state occurs, the output of the AND gate 51 rises.

As thus far described, the output of the AND gate 51 is pulsed each time the machine state represented by the state mask in register 45 occurs. Since the state depends upon the occurrence of masked chip-level events, the output of the AND gate 51 is said to be "event-driven".

The sequence of state occurrence signals output by the gate 51 is fed to the multimode error injection circuit 53. The circuit 53 acts to count the number of state signal occurrences in order to react in a predetermined manner by producing the INJECT signal. The predetermined manner of circuit action results in the production of an INJECT signal having particular temporal and duration characteristics. In this regard, the circuit 53 counts occurrences of the state signal and, upon reaching a particular count, produces an INJECT signal which can have the shape of a pulse or which can be conditioned to a predetermined level until reset. Further, the circuit can provide the desired INJECT signal delayed by an amount of time which is variable with respect to the occurrence of the desired count. Thus, the INJECT signal can mimic a fleeting transient error or one which, once occurring, is unvarying.

As with reference to FIG. 1 will verify, the INJECT signal results in production of simulated error in a particular chip only if masked at that chip. For example, conditioning of the INJECT signal with a logically positive transition will raise a CHECK signal at the output of the AND gate 56 only if a chip-level error is masked by setting the latch 58.

Figure 2:
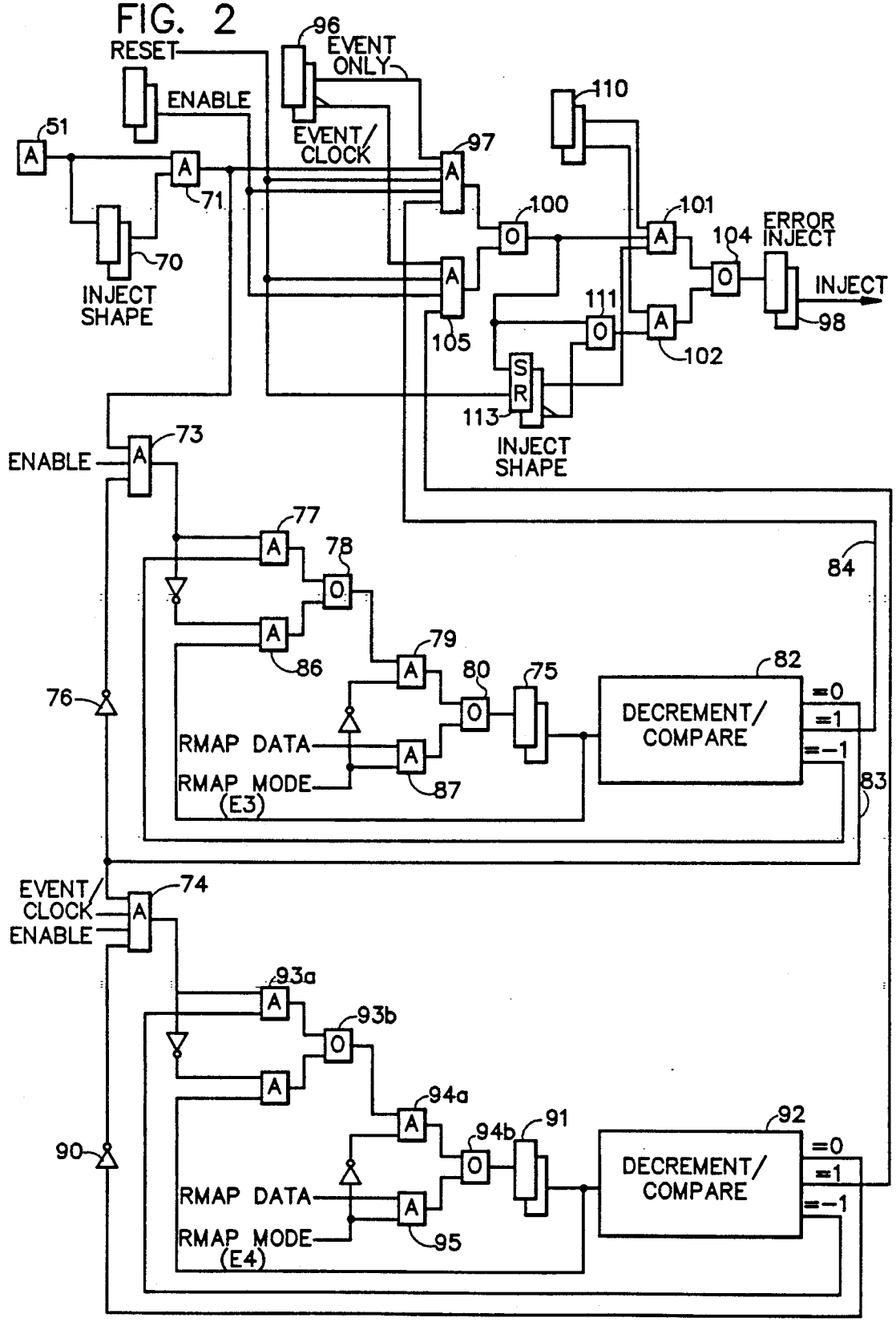
FIG. 2 is a detailed schematic diagram illustrating a circuit for selecting a mode of injection error.

Refer now to FIG. 2 for an understanding of the multimode error injection circuit 53. The circuit 53 conventionally conditions a state signal output by the AND gate 51 through a wave-shaping circuit consisting of a latch 70 and an AND gate 71. Each time the output of the AND gate transitions positively, the AND gate 71 emits a pulse termed the "STATE" signal. The pulse is provided to an occurrence counting circuit fed through the AND gate 73. The purpose of the occurrence counting circuit is to count the number of STATE signal pulses and to provide an indication when a predetermined count has been reached. This is done by loading an initial count into a counting register 75 and decrementing the contents of the register each time a START signal occurs. Assuming a positive output from the inverter 76 and a positive state of the ENABLE signal, each pulse output by the AND gate 71 causes the output of the AND gate 73 to pulse. This causes the AND gate 77 to pass the decremented count of the contents of register 75 back into the register 75 through the path OR 78 - AND 79 - OR 80. The decremented count is placed into the register 75, where it is presented to a conventional decrement and compare circuit 82. When received by the decrement and compare circuit, the count is decremented, and held in the circuit. In the circuit 82, the count is compared against a binary magnitude of zero and a binary magnitude of 1. If the count equals the value of zero, a signal is provided on the signal line 83. If the count has a magnitude of 1, a signal is provided on signal line 84. For each clock period in which the output of the AND gate 73 does not pulse, the output of the register 75 is wrapped back to its input without decrementing the count, through the path AND 86 - OR 78 - AND 79 - OR 80. On this path, the contents of the register 75 are not decremented. In this case, the output of the decrement and compare circuit 82 does not change.

The register 75 is initialized to a count through the signal path AND gate 87-OR gate 80, when the signal RMAP MODE (E3) is logically positive. The count entered into the register 75 is equal to the numerical digital value of the signal RMAP DATA.

When the contents of the register 75 have been decremented zero, the signal on line 83 disables the AND gate 73 through the inverter 76, but enables the AND gate 74, assuming that the output of the inverter 90 and the ENABLE and EVENT/CLOCK signals are logically positive. Now, the CLK signal provided to the register 91 causes the register's contents to decrement by one within each CLK signal cycle through a circuit identical to that just described for counting signal occurrence. This circuit decrements the register through the path 92 (decrement and compare) - 93a (AND) - 93b (OR) - 94a (AND) - 94b (OR). It is observed that the register 91 is programmable by way of the AND gate 95, assuming a positive state for the RMAP MODE (E4) signal, in which case the register 91 will be initialized to the digital value of RMAP Data. It should be evident that the clock count decrement circuit counts CLK occurrences only after a succession of state signal occurrences have decremented the count in register 75 to zero. It is asserted that, if the INJECT signal is to be raised, it will be raised either when the count of the register 75 goes to zero, or delayed from that event by a number of CLK pulses equal to the number in the register 92. It will be appreciated, therefore, that the INJECT signal can be delayed by a variable amount of time from a predetermined compound occurrence corresponding to the count in the register 75.

When the INJECT signal is to be generated only at the occurrence of compound event signified by reducing the count in the register 75 to zero, the latch 96 is set, its positive output (EVENT ONLY) being provided to AND gate 97 and its complementary output being provided as the EVENT/CLOCK signal to AND gate 74. Assuming positive values for the RESET and ENABLE signals, the output of the AND gate 97 will rise with the first positive transition of the AND gate 71 following a decrement of the count in the register 75 to one. Positive transition of the output of the AND gate 97 is provided to the error injector latch 98 by way of the signal path through the OR gate 100, one of the two AND gates 101 or 102, and the OR gate 104. It will be evident that the output of the error inject latch 98 will rise in response to that transition of the AND gate 71 which finally decrements the count of the register 75 to zero because that transition is also combined by the AND gate 97 with the signal on signal line 84 indicating that the count has been decremented to a magnitude of one. Therefore, the INJECT signal is provided at the output of the latch 98 concurrently with the zero count being indicated on the signal line 83.

Alternatively, if the latch 96 is reset, the EVENT/CLOCK signal will be positive, enabling the AND gate 105. Again, assuming positive levels for the RESET and ENABLE signals, the output of AND gate 105 will transition positively following decrementation of the count in the register 92 to a value of 1. Since the signal path through the output of the AND gate 105 will be the same as that described for the gate 97, the INJECT signal will rise concurrently with decrementation of the count in the register 92 to zero.

The shape of the INJECT signal is determined by the state of the latch 110. When the latch 110 is set, and AND gate 102 is enabled, the output of the gate will rise in response to a positive transition at the output of the OR gate 111. The OR gate 111 receives the output of the OR gate 100 and the positive output of the edge-triggered SET-RESET latch 113. When a positive transition is taken by the output of the AND gate 97 or the AND gate 105, the output of the OR gate 100 rises, setting the latch 113. The OR gate 111 merges the pulse output of the gate 100 and the positive output of the latch 113 to provide a signal which transitions to a positive level in synchronism with the transition of the output of the OR gate 100 and then stays at the positive level until the latch 113 is reset.

Alternatively, assume that the latches 110 and 113 are reset. Now, the AND gate 101 receives the positive levels of the complementary outputs of the latches 110 and 113 and pulses positively in response to the pulse output by the OR gate 100. The pulse is fed through the OR gate 104 to the latch 98.

Obviously, the output of the latch 98 (the INJECT signal) will follow the input provided through the OR gate 104, with the INJECT signal pulsing with a signal provided through AND gate 101 or transitioning to a positive level with the output of the AND gate 102.

Figure 3:
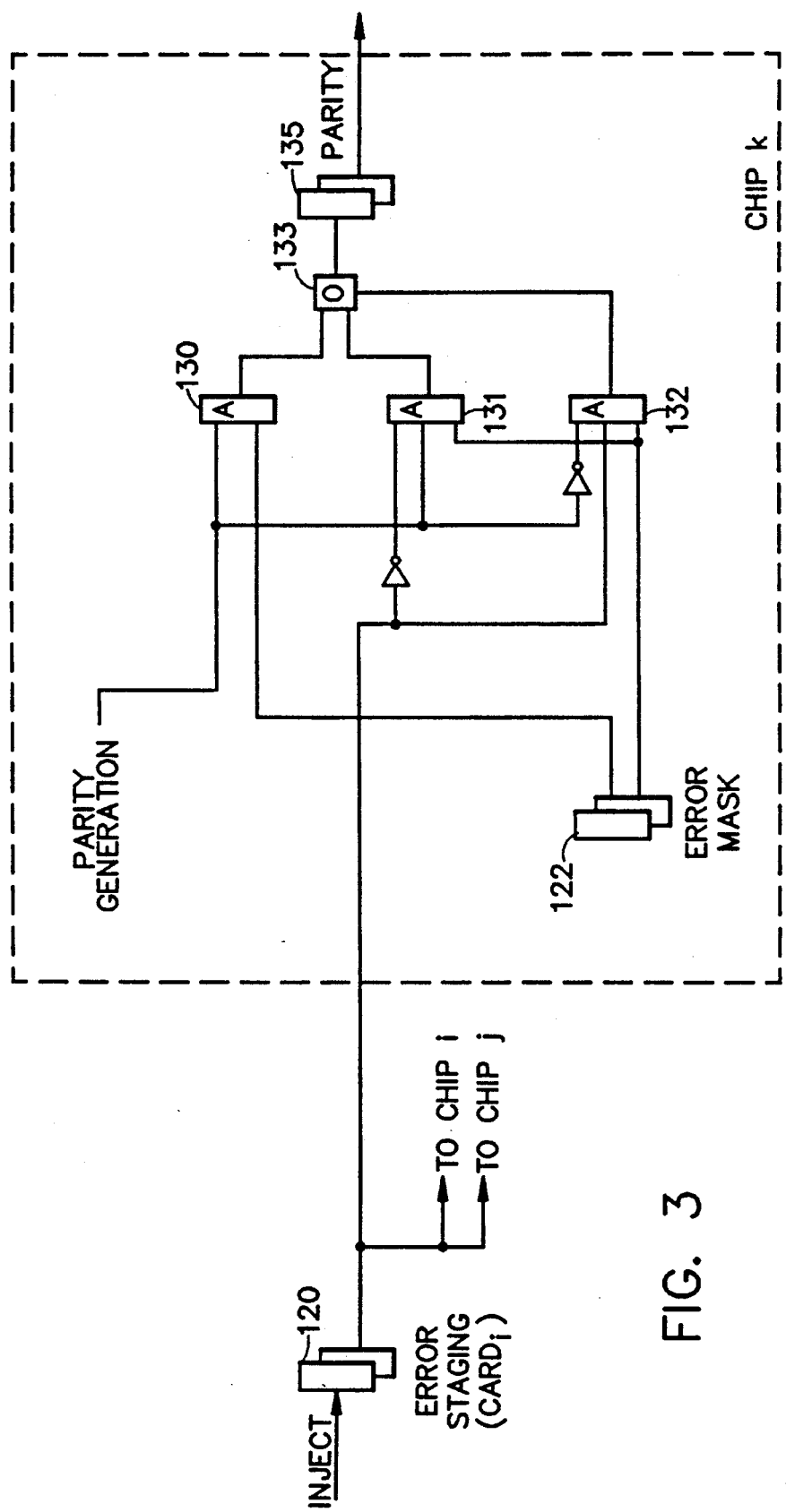
FIG. 3 is a schematic diagram of a parity error generator which operates in response to the error injection signal generated by the circuit of FIG. 2.

An example of a simulated error which occurs in response to an INJECT signal is illustrated in FIG. 3. Assume in FIG. 3 that the INJECT signal is staged onto a card through an error staging latch 120. The output of latch 120 is fed to chips i, j and k on the card for generation of injected errors. On chip k, the error condition, if enabled by the masked bit and the latch 122 will configure parity generation circuitry consisting of gates 130–133 to incorrectly generate parity. If the error mask bit is reset, the generated parity signal is given correctly by the output of the AND gate 130 to the OR gate 133 and the latch 135. If the error mask bit is enabled, the parity bit generated will be inverted from its correct sense by one of the gates 131 or 132.

One will appreciate that provision of a pulsed INJECT signal upon the counting of STATE signal occurrences will result in intermittent injection of errors, with each injection occurring each time the STATE signal pulses for a number of times equal to the preset value in the register 75. This can be termed an "intermittent" mode of error injection. On the other hand, if the latch 110 is set, the INJECT signal will be continuously asserted, resulting in the injection of masked errors with each CLK transition following the getting of the latch 113. This is referred to as a "continuous" mode of error injection.

Programmability of the event-controlled error injection system of this invention is provided through access of the SP 9 to the mask registers 28, 45, and 58 of FIG. 1. The SP 9 is also connected by means not illustrated to the count registers 75 and 91 by way of the RMAP mode (E3), RMAP mode (E4) and RMAP DATA signals. Last, the SP 9 also provides the error mode selection by conventional programming interfaces to the latches 96, 110, and through circuitry not illustrated to the signals ENABLE and RESET.

Obviously, many applications and variations of this invention will occur to those skilled in the art, and may be practiced without departing from the spirit of this invention and without avoiding the scope of the following claims.

We claim:

1. In a processing machine in which a plurality of machine events occur over time, a system for injecting simulated errors into said machine for test and evaluation of machine processes, comprising:
   a programmable mask means in said machine for providing a masking signal identifying a mask-defined machine event;
   a machine event detector in said machine for providing an event signal indicating a machine event;
   comparison means connected to said programmable mask means and to said machine event detector for indicating the occurrence of said mask-defined machine state in response to said masking signal and said event signal;
   count means connected to said comparison means for counting occurrences of said mask-defined machine event; and
   programmable error injection means, connected to said count means, for injecting an error into said machine upon said count means reaching a certain count.

2. The system of claim 1, further including:
   delay means in said programmable error injection means for selectably delaying the injection of said error from said certain count.

3. The system of claim 1, wherein said programmable error injection means is for intermittently injecting said error into said machine.

4. The system of claim 1, wherein said programmable error injection means is for continuously injecting said error into said machine.

5. An error injection system for a processor in which events occur, said events denoting conditions, particular sets of said conditions defining respective machine states, said error injection system including:
   an event detector in said processor for generating a signal identifying a machine event;
   an event mask means for producing a mask signal defining a set of events;
   an event set detector connected to said event detector and to said event mask means and responsive to said event signal and to said mask signal for producing an event occurrence signal denoting detection by said event detector of an event in said set of events;
   a machine state detector connected to said event set detector for producing a machine state signal in response to said event occurrence signal, said machine state signal denoting occurrence of a machine state defined, in part, by said event; and
   error injection means connected to said machine state detector for injecting a defined error into said processor in response to said machine state signal.

6. The error injection system of claim 5, in which said event set detector produces a plurality of event occurrence signals, each of said event occurrence signals denoting detection by said event set detector of an event in said set of events, and said machine state detector produces a plurality of machine state signals in response to said plurality of event occurrence signals, and in which said error injection means includes:

- a counter connected to said machine state detector for providing a count signal when said plurality of said machine state signals equals a machine state occurrence count;
- an error injector connected to said counter for producing an injection signal in response to provision of said count signal; and
- an error producing means connected to said error injector for injecting said defined error into said processor in response to said count signal.

7. The error injection system of claim 6 in which said error injection means further includes delay means connected to said counter and to said error injector for delaying the provision of said count signal to said error injector.

8. The error injection system of claim 6 in which said error injection means further includes wave-shaping means connected to said error injector for conditioning the waveshape of said injection signal, and in which said error producing means injects said defined error with occurrence characteristics corresponding to said shape of said injection signal.

9. The error injection system of claim 8 in which said shape of said injection signal is a pulse and said defined error is pulsed.

10. The error injection system of claim 8 in which said shape of said injection signal is a constant level and said defined error is continuously injected.

* * * * *